Nov. 21, 1961 F. C. SCHWANEKE 3,010,006
COOKING UTENSIL
Filed Oct. 2, 1953 3 Sheets-Sheet 1
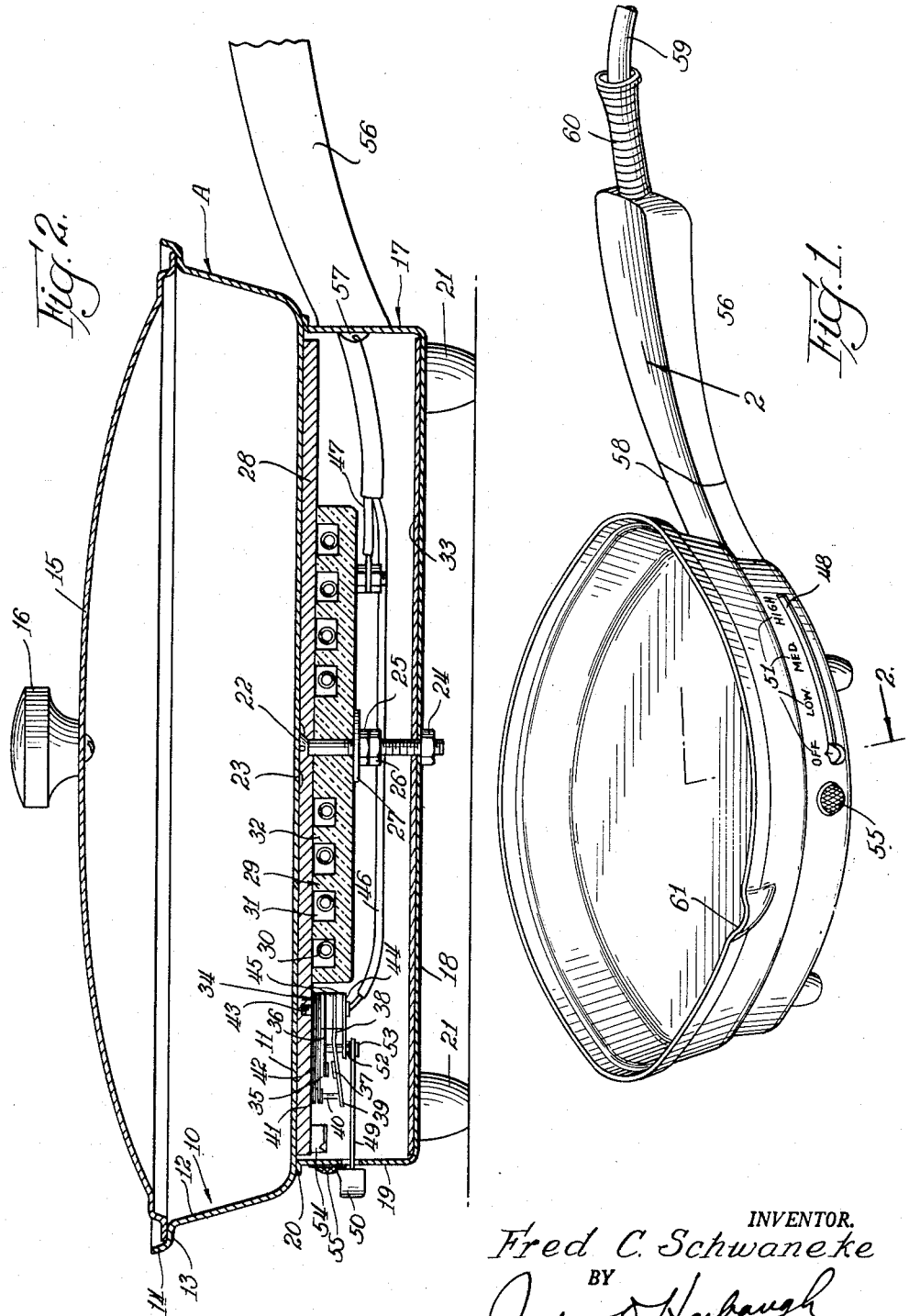
INVENTOR.
Fred C. Schwaneke
BY
Watson D Harbaugh
Att'y.

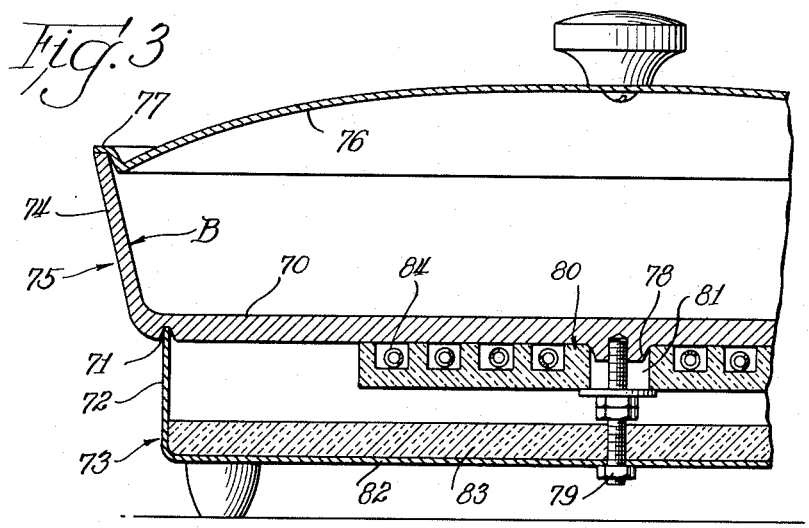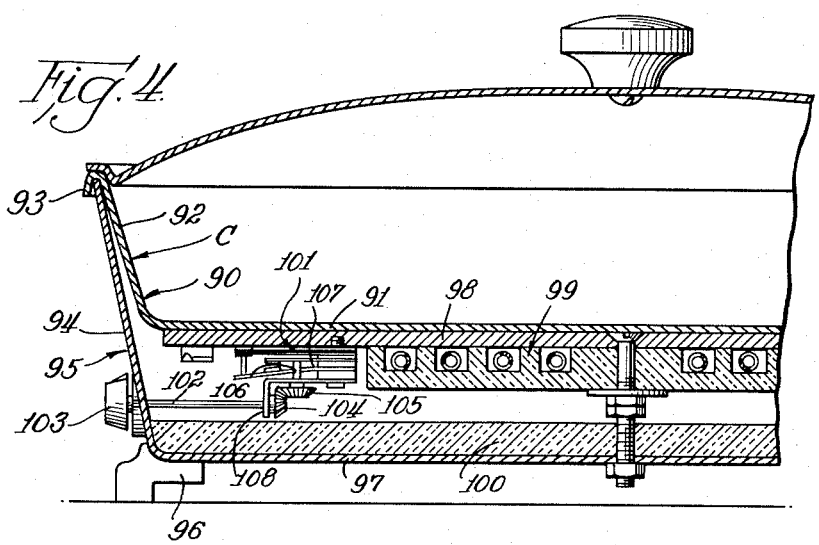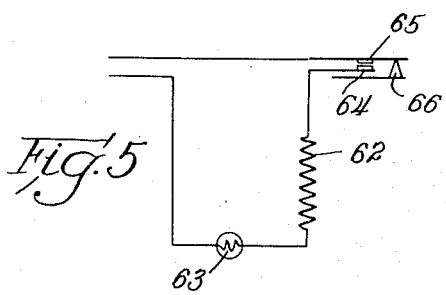

Nov. 21, 1961  F. C. SCHWANEKE  3,010,006
COOKING UTENSIL
Filed Oct. 2, 1953  3 Sheets-Sheet 3
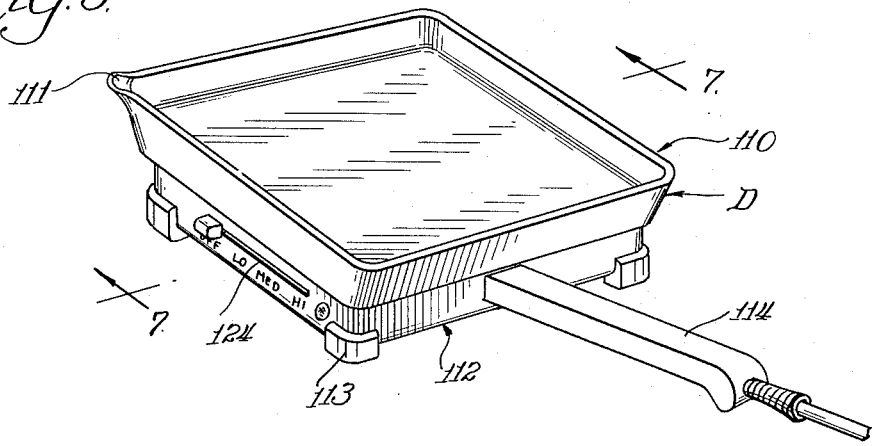
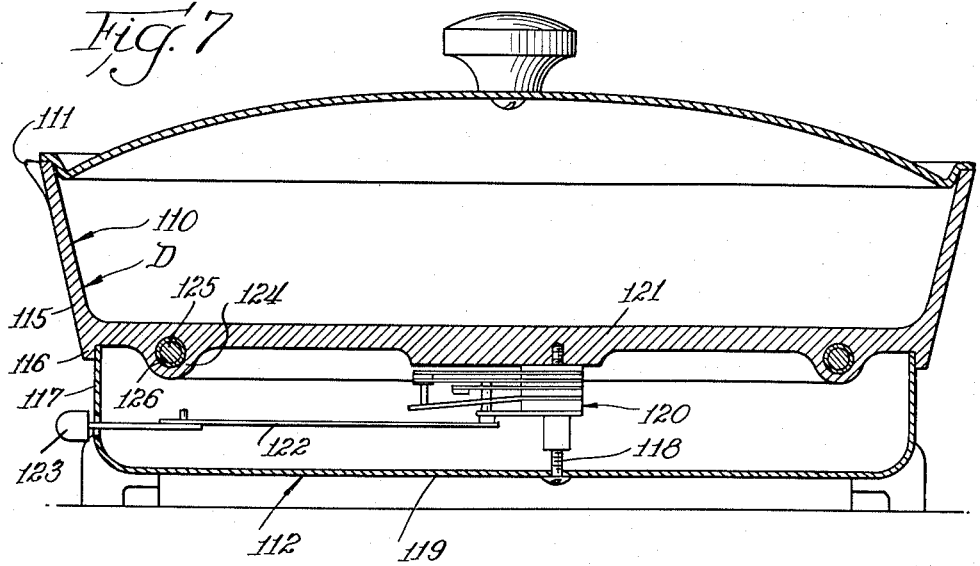
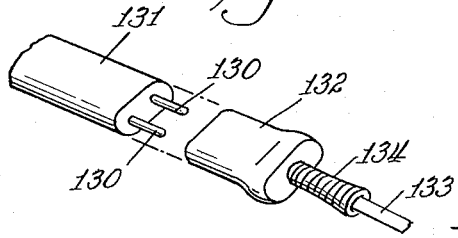
INVENTOR.
Fred C. Schwaneke
BY
Watson D. Harbaugh
Att'y.

ice 3,010,006
Patented Nov. 21, 1961

3,010,006
COOKING UTENSIL
Fred C. Schwaneke, Chicago, Ill., assignor, by mesne assignments, to Webcor, Inc., Chicago, Ill., a corporation of Illinois
Filed Oct. 2, 1953, Ser. No. 383,767
2 Claims. (Cl. 219—44)

This invention relates to a cooking pan and heating means therefor, and more particularly to a frying pan having an electric heating element as an integral part thereof.

An object of the invention is to provide a frying pan having electric heating means, preferably thermostatically controlled, whereby the temperature is accurately regulated. Another object of the invention is in providing an electric frying pan or the like, having means for distributing the heat developed in an electric heating element evenly and rapidly throughout substantially the entire bottom wall of the pan. Still another object is to provide an electric frying pan equipped with a heating element; a member of good heat conductivity being interposed between the element and the bottom of the pan to effect a uniform distribution of heat thereacross; and a heat reflective member being positioned below the heating element to reflect the heat upwardly toward the member of good heat conductivity.

A further object is to provide in a frying pan, as described, thermostatic control means so arranged that the thermostat is responsive to substantially the average temperature across the bottom of the pan. Yet a further object is to provide a novel arrangement for assembling a frying pan, having as an integral part thereof electric heating means.

The embodiments of the invention are illustrated in the accompanying drawings, in which:

FIG. 1 is a perspective view of a frying pan incorporating my invention and in which the frying pan cover is removed.

FIG. 2 is a transverse, sectional view taken on the line 2—2 of FIG. 1.

FIG. 3 is a broken, vertical, sectional view, showing a modified form of the invention.

FIG. 4 is a broken, sectional view, showing a further modification of the invention.

FIG. 5 is a schematic diagram of the electric circuit for the frying pan.

FIG. 6 is a perspective view of a modified form frying pan, incorporating my invention.

FIG. 7 is a transverse, sectional view, taken on the line 7—7 of FIG. 6.

FIG. 8 is a broken, perspective view, showing a form of handle and electric plug that may be used with the frying pan.

Reference will first be made to FIGS. 1 and 2 in particular to show an electric frying pan that is indicated generally with the letter A. The frying pan A includes a pan portion 10, having a bottom wall 11, and outwardly and upwardly inclined side walls 12 that at their upper end are turned laterally at 13 and then upwardly at 14 to provide a seat for a cover 15, which is equipped with the customary knob or handle 16. The specific geometric configuration of the frying pan A may take any desired form, but preferably the pan is generally circular as is illustrated. While the material from which the pan 10 and cover 15 are made may be any of the conventional frying pan materials, I prefer to use stainless steel.

Most desirably, the electric apparatus used to heat the pan 10 is enclosed within a housing 17 that provides a bottom wall 18 and generally vertical side walls 19. At their upper end the side walls 19 are equipped with a laterally turned shoulder 20, providing a seat upon which the pan 10 is positioned. The housing or cover 17 is equipped with a plurality of spaced apart feet 21 that may be secured to the housing in any desired manner, such as by cap screws that are threadedly received within the bottom wall 18 and that extend through bores provided centrally through the feet 21.

As is seen best in FIG. 2, an elongated bolt or stud 22 is rigidly secured to the under side of the bottom wall 11 of the pan and this rigid mounting may be accomplished by welding the cap screw in position, as is illustrated at 23. Preferably the stud 22 is aligned centrally on the bottom wall 11. The stud 22 is threaded at its outer end and threadedly receives thereon a nut 24. Similarly, the stud has a threaded intermediate portion that threadedly receives thereon a nut 25 and lock nut 26. A washer 27 rests upon the nut 25. The specific function of the stud 22 and nuts will be set out later.

Abutting the underside of the bottom wall 11 is a heat distributing member 28 that is equipped centrally with an opening therethrough that receives the shank of the stud 22. As is illustrated in FIG. 2, the member 28 covers substantially the entire under surface of the bottom wall 11. The member 28 is effective to distribute substantially evenly across the complete bottom wall 11 the heat developed in the heating coil. Therefore, the member 28 should be formed of a material having good heat transfer properties or good heat conductivity. While a number of metals may be used, I prefer to employ aluminum.

A heating element designated generally by the numeral 29 is also provided, and the element 29 is formed by a plurality of electric coils 30 that wind in snake-like fashion through channels or recesses 31, provided in an insulating base or support member 32. The heating elements of this character are well known in the art, and it is believed, therefore, that a detailed description thereof is unnecessary. Suffice it to say that the member 32 is formed from a material having good properties of electrical insulation and that the electric coils 30 may be formed from a continuous coil of wire, having relatively high resistance to the flow of electricity therethrough, so that a large amount of heat is developed when an electric circuit through the coil is established.

The member 32 is provided centrally with a bore therethrough that receives the shank of the stud 22. The member 32, as well as the aluminum heat transfer member 28, are held in position against the bottom wall of the pan by means of the nuts 25 and 26, which are drawn tightly against the washer 27 and bottom of the member 32.

In order to make the frying pan more efficient a sheet of material 33 is provided adjacent the bottom wall 18 of the cover or housing 17. The member 33 functions to reflect heat upwardly toward the heat transfer member 28 and to thereby keep the bottom wall 18 of the housing relatively cool. As an example, one of the heat reflective insulating materials that may be used for this purpose, aluminum foil is suggested.

As is clear from FIG. 2, the housing 17 is secured in place by means of the nut 24 that is tightened against the bottom wall 18 upon the threaded end portion of the stud that extends through an appropriate opening in the bottom wall of the housing.

It is desired to provide an on-off switch and a thermostatic control for the frying pan A. I, therefore, provide a thermostat that is indicated generally by the numeral 34. The thermostat 34 provides an electric contact 35, supported upon a flexible arm 36 and a second contact 37 supported upon a flexible arm 38, having a forward extension 39 adapted to abut an insulating stud 40. The stud 40 is carried by a bimetallic member 41, having elongated arms 42 that are in thermo contact with a heat transfer element 43, threadedly received within a threaded recess provided by the member 28. Preferably, the member 43 is a treated end portion of the cap screw 44 that rigidly holds the bimetallic member and the contact members securely to the member 28. As is seen in FIG. 2, a plurality of insulating spacer members 45 are interposed between the arms 36 and 38 and between the arm 36 and between the member 42 and the heat transfer member 28. The members 45 function to separate the arms 36 and 38 electrically while all of the members 45 are also relatively good heat insulating members.

It is also clear from FIG. 2 that an electric circuit provided by the leads 46 and 47 includes in series the electric heating coil 30 and the thermostat 34, so that appropriate regulation of the thermostat would be effective to interrupt the circuit through the heating coil at desired times.

To provide manual adjustment of the thermostat and at the same time provide an on-off switch, an elongated slot 48 is cut circumferentially about the side wall 19 of the housing 17, as may be seen best in FIG. 1. Slidably received through the slot 48 is an actuating arm 49 equipped at its outer end with an indicator knob 50, having a pointer or pointed portion thereon, adapted to be aligned with the regulating indicia 51 stamped or embossed upon the outer surface of the wall 19. When the knob 50 and lever 49 are moved to the left, as shown in FIG. 1, the electric contacts 35 and 37 of the thermostat are opened and the circuit through the electric heating coil is then interrupted. It will be appreciated that the arm 38, carrying the lower contact 37, is formed of spring metal and is so arranged that the contact is normally biased in the lower or open position shown. If the knob 50 and lever are swung to the right, the cam 52 and cam follower 53 are made to lift the lower contact 37 against the upper contact 35 and the electric circuit is thereby completed. As the knob and lever are moved farther to the right, the extension 39 of the arm 38 is pushed upwardly and through the insulating stud 40 and moves the bimetallic thermostat upwardly, and the two contacts 35 and 37 are brought into tighter engagement and, in fact, the upper contact 35 and arm 36 that carries the same are swung upwardly. Therefore, a greater heat must be developed by the heating coil 30 in order for the bimetallic members 41 to swing the lower contact 37 away from the contact 35 and to thereby interrupt the electric circuit. Thus, the heat to which the frying pan may be raised is selectively controlled by the swing arm 49.

So that it will be evident to the user when the frying pan is being heated, a small electric bulb 54 is provided in circuit with the heating coil and thermostat and, as is seen in FIG. 1, a glass window 55 is provided in the side wall 19 of the housing, so that a visual indication appears when the heating circuit is energized.

A handle 56 is provided for the frying pan, and preferably the handle is secured to the housing 17 by a screw 57. If desired, as is most clear from FIG. 1, the handle 56 may be inserted into a socket 58 carried by the housing 17. Preferably, the handle 56 has a longitudinally extending passage therethrough that receives the electric leads 46 and 47 which are brought together in the handle and extend outwardly therefrom as the cord 59. A wire coil 60 may be secured to the handle 56 at the outer end thereof to prevent the cord 59 from being kinked sharply, which would in time bring about a breakage of the electric wires thereof. The frying pan may also be formed with one or more pouring spouts 61. It will be appreciated that the cord 59 is equipped at its outer end with a suitable plug adapted to be inserted in an electric outlet. Further, the feet 21, handle 56 and knob 16 are preferably formed of a material that does not heat up rapidly, such as, for example, phenolic.

If reference is made to FIG. 5, which is a schematic diagram, it is believed that the electric circuit for the frying pan will be quite clear. For the sake of clarity, the heating coil is indicated as a resistance and the numeral 62 is attached thereto. Similarly, the indicator light is shown and assigned the number 63. The electric contacts are numbered 64 and 65, while the member that adjusts the position of the contacts is indicated by the numeral 66.

A modified form of the invention is illustrated in FIG. 3, and it will be seen that the frying pan here, which is designated by the letter B, has a bottom wall 70, provided with an annular recess 71 on the underside thereof that receives therein the upper end of the vertical side wall 72 of the housing 73. As a further change, the side wall 74 of the pan 75 tapers gradually upwardly and outwardly while the cover or lid 76 has an upwardly and outwardly turned end portion 77, that is received upon the upper end of the side wall 74. Further, the bottom wall 70 of the pan is equipped centrally with a depending boss 78, having a threaded recess therein that threadedly receives the end of the cap screw 79. The heating element 80 has an enlarged bore 81 therethrough that receives, with considerable clearance, the shank of the cap screw 79. In place of a thin strip of insulating material along the bottom wall 82 of the housing 73 a relatively thick pad of insulation 83 is provided.

In this modification, the pan 75 is formed from a material that conducts heat readily, and preferably the material is aluminum. Therefore, the heat generated or developed in the coils 84 of the heating element 80 is spread quickly and with considerable uniformity throughout the entire surface of the bottom wall 70 and also upwardly along the side walls 74. With these deviations, the frying pan B is otherwise substantially similar to the pan illustrated in FIGS. 1 and 2, and that has hereinbefore been described in detail.

A further modification is illustrated in FIG. 4 and in this modification the frying pan C provides a pan portion 90, having a bottom wall 91 and outwardly and upwardly extending side wall 94 turned upon itself at its upper end to provide the hooked portion 93. The side wall 94 of the housing 95 is elongated and at its upper end is received within the hooked portion 93 of the pan. A modified type of foot 96 is provided for the housing 95 and these are secured to the bottom wall 97 of the housing in any suitable manner, such as by cap screws, not shown. In this embodiment, the pan 90 is preferably formed of stainless steel or similar material and the heat transfer member 98 is therefore provided for distributing evenly the heat developed by the heating element 99. A thick pad of insulation 100 is provided along the bottom wall 97 of the housing for the purpose of keeping the bottom wall 97 relatively cool, while at the same time directing the heat upwardly, as has been previously described.

The thermostat and on-off switch 101 is also changed slightly from the one shown in FIG. 2 and which has already been described, in that, instead of the swing arm, the thermostat is equipped with a rotatable shaft 102 having a knob 103 at its outer end adapted to be manually rotated and a beveled gear 104 at its inner end adapted to mesh with and rotate a complementary beveled gear 105 in operative arrangement with a shaft 106, threadedly received within the beveled gear 105 and that engages at its upper end an arm 107 of the thermostat. By rotating the knob 103, shaft 102 and gear 104 in one direction, the gear 105 rotates to raise the shaft 106 which will close the switch contacts and in time will suitably adjust the bimetallic members and contacts to an extent where greater heat must be developed by the heating element 99 before the thermostat interrupts the circuit. As is believed clear from FIG. 4, the shaft 102 is rotatably supported adjacent one end within the wall 94 and at its other end within a bracket 108. With the exceptions indicated, the structure is otherwise like those that have been previously described.

An additional modification of the invention is illustrated in FIGS. 6 and 7. In this embodiment of the invention, the frying pan D provides a pan portion 110 that is generally square shaped and has a spout 111 at a corner portion thereof. The housing 112 that encloses the heating element, etc., is also generally square shaped and is provided at each corner with feet 113 that have rounded outer surfaces. The feet are screwed to the housing 112 in a suitable manner, such as those that have been suggested before. The usual handle 114 is also screwed to the housing 112 in any conventional manner.

The pan 110 is preferably formed from a material having good heat conducting properties, such as aluminum. The pan 110 provides a side wall 115, having a depending peripheral lip 116 thereabout that abuts the outer surface of the wall 117 of the housing 112 adjacent the upper end thereof. The housing 112 is secured to the pan 110 by means of the threaded stud 118, which extends through an opening in the bottom wall 119 of the housing 112 and also through the thermostat switch 120 and is threadedly received within a threaded recess provided in the bottom wall 121 of the pan 110. The thermostat switch 120 is operatively arranged with the swing arm 122, having a knob 123 at the outer end thereof. As is seen best in FIG. 6, the arm arrangement 122 is adapted to move through a slot 124 provided in the side wall 117 of the housing. The operation and construction of the switch 120 is substantially identical with the one illustrated in FIG. 2 and that has already been described, and, therefore, a more elaborate description of the thermostat here shown will not be set out.

Adjacent the outer edge of the bottom wall 121, the wall is equipped with a depending boss 124 and follows along the edge of the wall to make substantially a complete loop. The boss provides a passage 125 therethrough that receives therein the heating element 126 that is formed in the usual manner and consists of an electric insulator supporting an electric heating coil in insulated relation with the aluminum pan. The coil is in series with the thermostat 120 and the circuit therethrough is completed and controlled by proper positioning of the thermostat control.

In FIG. 8, a socket is shown that may be used if desired with any of the embodiments of the invention hereinbefore set out. The socket connection is formed by a pair of prongs 130 that project outwardly from the end of the handle 131. It will be understood that the prongs 130 are connected to electric leads imbedded within the handle 131 and that form a portion of the circuit for the heating coil and thermostat. A conventional female plug 132 is adapted to receive the prongs 130 and is equipped with the customary cord 133, having electric leads therein and which is surrounded by a spring coil 134 to prevent breakage of the cord at the socket.

*Operation*

While the operation of the embodiments hereinbefore described and which are illustrated in the drawings is similar, the operation of the embodiment shown in FIGS. 1 and 2 will be set out in substantial detail and any departures therefrom found in the various modifications will thereafter be described.

Referring, first, then, to FIGS. 1 and 2, the frying pan A is ready for operation when the cord 59 is plugged into a suitable electric outlet. The user of the frying pan, after placing the material therein which it is desired to cook and thereafter covering it with the lid 15, if this is desired, will swing the knob 50 to the right until the contact 37 is moved upwardly and into electric engagement with the contact 35. When this occurs, the electric circuit will be completed and the indicator light 54 will be lighted. If it is desired to have a low heat, the knob 50 is positioned adjacent the indicia 51 that indicates low, and if a higher cooking temperature is required, the knob may be positioned at any desired point between low and the end of the slot 48, which is represented by the indicia "high."

The current flowing through the electric coil 30 will develop a large degree of heat, and this heat will be quickly transferred through the heat transfer member 28 throughout the entire surface of the bottom wall of the pan. Thus, a relatively even heat will be provided completely across the pan, and no excessive hot spots and cold portions about the pan will result. When the temperature approaches that for which the thermostat has been set, the bimetallic members 41 through the insulating stud 40 will progressively drive the contact arm extension 39 downwardly until the contacts 35 and 37 break, and the circuit to the heating coil is thereby interrupted. As the pan cools, the bimetallic member will move in the reverse direction until the arm 39 is swung upwardly to bring the contacts 35 and 37 together. The heating coil 30 will then again be energized.

It is noted that the heat reflecting member 33 keeps the bottom wall 18 of the housing relatively cool and minimizes the dissipation of heat therethrough. At the same time, the heat transfer member 28 is effective to quickly transfer the heat developed in the coil 30 across the entire surface of the pan bottom wall, and the food within the pan is therefore cooked at an even rate regardless of its position within the pan. It should be noted that the thermostat 34 is positioned in spaced relation with the heating element 29 and derives substantially all of the heat that causes it to function from the heat transfer member 28 and through the stud member 43. Because the member 43 is imbedded within the heat transfer member 28 and is in thermo-contact therewith at a point spaced from the heating element, the thermostat becomes responsive primarily to the average heat developed across the bottom wall of the pan and provides a fairly accurate response and one that approximates closely the temperature that is desired.

The embodiment of the invention illustrated in FIG. 4 operates in substantially the identical manner, the important difference being in the mode of operation of the thermostat switch 101, which is adjusted through the gears 104 and 105 that has been already described. In this embodiment, however, it is noted that the side wall 92 of the pan 90 is enclosed by the upwardly extending wall 94 of the housing 95. Therefore, the housing not only serves to enclose the heating elements but also encloses the pan and provides insulation therethrough. It can be seen in FIG. 4 that the side wall 94 of the housing is spaced slightly from the side wall 92 of the pan and as a result a dead air space exists between the two walls that further helps in insulating the pan.

In the FIG. 3 embodiment, the pan 75 is formed of a material that has the properties of conducting heat readily. Therefore, it is unnecessary to provide a heat transfer member complementary to the member 28 shown in FIG. 2 or the member 98 shown in FIG. 4. The bottom wall 70 of the pan itself quickly distributes the heat developed in the coils 84 and provides a relatively uniform cooking temperature throughout the entire area of the bottom wall 70.

In the embodiment of FIGS. 6 and 7, the pan 110 is also formed from a material that conducts heat readily, such as aluminum. Also, in this embodiment then it was unnecessary to provide a heat transfer member having good heat conducting properties between the heating coil and the bottom wall of the pan. Instead, the heating coil is embedded within the bottom wall 121 of the pan and the heat developed by the coil is quickly distributed throughout the entire area of the pan bottom wall. It should be noted that the heating coil is adjacent the outer edge of the bottom wall 121, rather than at a point adjacent the center thereof or at some intermediate point. This positioning of the heating coil is highly advantageous in that the circulation of heat through the material within the pan is from the outside or outer wall of the pan toward the center thereof. Thus, the center portion of the pan is heated both by circulation through the material within the pan and by heat transfer through the bottom wall itself. The result is that the central portion of the pan is at substantially the same temperature as the outer portion thereof and the relatively uniform heat is present across the entire bottom wall of the pan.

In each of the embodiments, the thermostat is spaced from the heating coil or heating element and does not then respond initially to the heat present in the heating element, which would be an undesirable condition in that the heating circuit would be interrupted prematurely and before the entire pan bottom wall was up to the desired temperature. When the thermostats are positioned, as has been described, they respond more nearly to the average temperature present across the bottom wall of the pan and the desired cooking temperature is most nearly approximated.

While in the foregoing specification, embodiments of the invention have been set out in considerable detail for purposes of illustration, it will be appreciated that those skilled in the art may deviate considerably from these details without departing from the spirit and principles of the invention.

I claim:

1. An electric cooking vessel comprising a thin wall pan adapted to receive food and having relatively poor heat conductivity along its bottom wall, a heat distributing member of a thickness substantially greater than the thickness of the bottom wall contacting substantially the entire bottom surface of said bottom wall in intimate heat exchange relationship therewith, electric heating means of an area substantially less than that of said heat distributing member mounted in intimate heat exchange relationship with said heat distributing member, an electric circuit for said heating means including a thermostat in circuit with said heating means and having a temperature sensing member spaced an appreciable distance from said heating means and disposed in intimate heat exchange relationship with said heat distributing member.

2. A unitary electric cooking vessel comprising a thin wall pan defining a chamber for receiving food and having a flat bottom wall, a heat distributing element of a thickness substantially greater than the thickness of said thin wall disposed in intimate heat exchange relationship therewith, electric heating means of an area substantially less than that of said heat distributing element disposed in intimate heat exchange relationship with said heat distributing element, an electric circuit for said heating means including a thermostat in circuit with said heating means and having a temperature sensing member spaced an appreciable distance from said heating means and disposed in intimate heat exchange relationship with said heat distributing element, a housing enclosing said heating means and heat distributing element, a heat reflective element in said housing for reflecting heat upwardly toward said heat distributing element, said temperature member being disposed between said elements.

References Cited in the file of this patent

UNITED STATES PATENTS

| | | |
|---|---|---|
| 839,255 | Ayers | Dec. 25, 1906 |
| 1,318,168 | Newsom | Oct. 7, 1919 |
| 1,375,780 | Khotinsky | Apr. 26, 1921 |
| 1,386,303 | Armstrong | Aug. 2, 1921 |
| 1,388,116 | Monson | Aug. 16, 1921 |
| 1,678,885 | Thomas | July 31, 1928 |
| 1,974,360 | Kimmel | Sept. 18, 1934 |
| 2,024,454 | Justheim | Dec. 17, 1935 |
| 2,187,888 | Nachumsohn | Jan. 23, 1940 |
| 2,189,127 | Brannon | Feb. 6, 1940 |
| 2,257,451 | Barnes | Sept. 30, 1941 |
| 2,357,634 | Crites | Sept. 5, 1944 |
| 2,541,637 | Christopher | Feb. 13, 1951 |
| 2,571,782 | Swenson | Oct. 16, 1951 |
| 2,597,695 | Braski | May 20, 1952 |
| 2,706,766 | Huffman | Apr. 19, 1955 |
| 2,785,277 | Jepson | Mar. 12, 1957 |

FOREIGN PATENTS

| | | |
|---|---|---|
| 128,410 | Great Britain | June 25, 1919 |
| 322,851 | Great Britain | Dec. 19, 1929 |
| 630,376 | Germany | June 4, 1933 |
| 474,628 | Great Britain | Nov. 4, 1937 |
| 486,318 | Great Britain | June 2, 1938 |
| 249,084 | Switzerland | Mar. 16, 1948 |